United States Patent

Shafer

[11] 4,226,501
[45] Oct. 7, 1980

[54] FOUR MIRROR UNOBSCURRED ANASTIGMATIC TELESCOPE WITH ALL SPHERICAL SURFACES

[75] Inventor: David R. Shafer, Fairfield, Conn.

[73] Assignee: The Perkin-Elmer Corporation, Norwalk, Conn.

[21] Appl. No.: 950,647

[22] Filed: Oct. 12, 1978

[51] Int. Cl.² ............................................. G02B 17/06
[52] U.S. Cl. ...................................... 350/55; 350/294
[58] Field of Search ........................... 350/55, 294, 27

[56] References Cited

U.S. PATENT DOCUMENTS 3,748,015  7/1973  Offner ................................... 350/55

Primary Examiner—Jon W. Henry
Attorney, Agent, or Firm—Salvatore A. Giarratana; Francis L. Masselle; Edwin T. Grimes

[57] ABSTRACT

A telescope made only of spherical mirrors including a first mirror system comprising a first, concave spherical mirror and a second, convex spherical mirror have a common center of curvature, the ratio of the radius of said first, concave mirror to said second convex mirror being approximately $\sqrt{5}+1:\sqrt{5}-1$, said first mirror arranged to intersect input rays of collimated light and to direct them to said second mirror, said first and second mirrors arranged off axis so as to not obstruct the light path to said first mirror; and a second mirror system comprising at least a third, concave mirror and a fourth, convex mirror having a common center of curvature, the radius of said third mirror being approximately twice the radius of said fourth mirror, said third mirror positioned to intersect light reflected from said second mirror and to reflect it to said fourth mirror, said fourth mirror reflecting light back to said third mirror from which it is reflected to form a real image, the optical axis of said system being defined by a line between the centers of curvature of said first and second systems.

8 Claims, 7 Drawing Figures

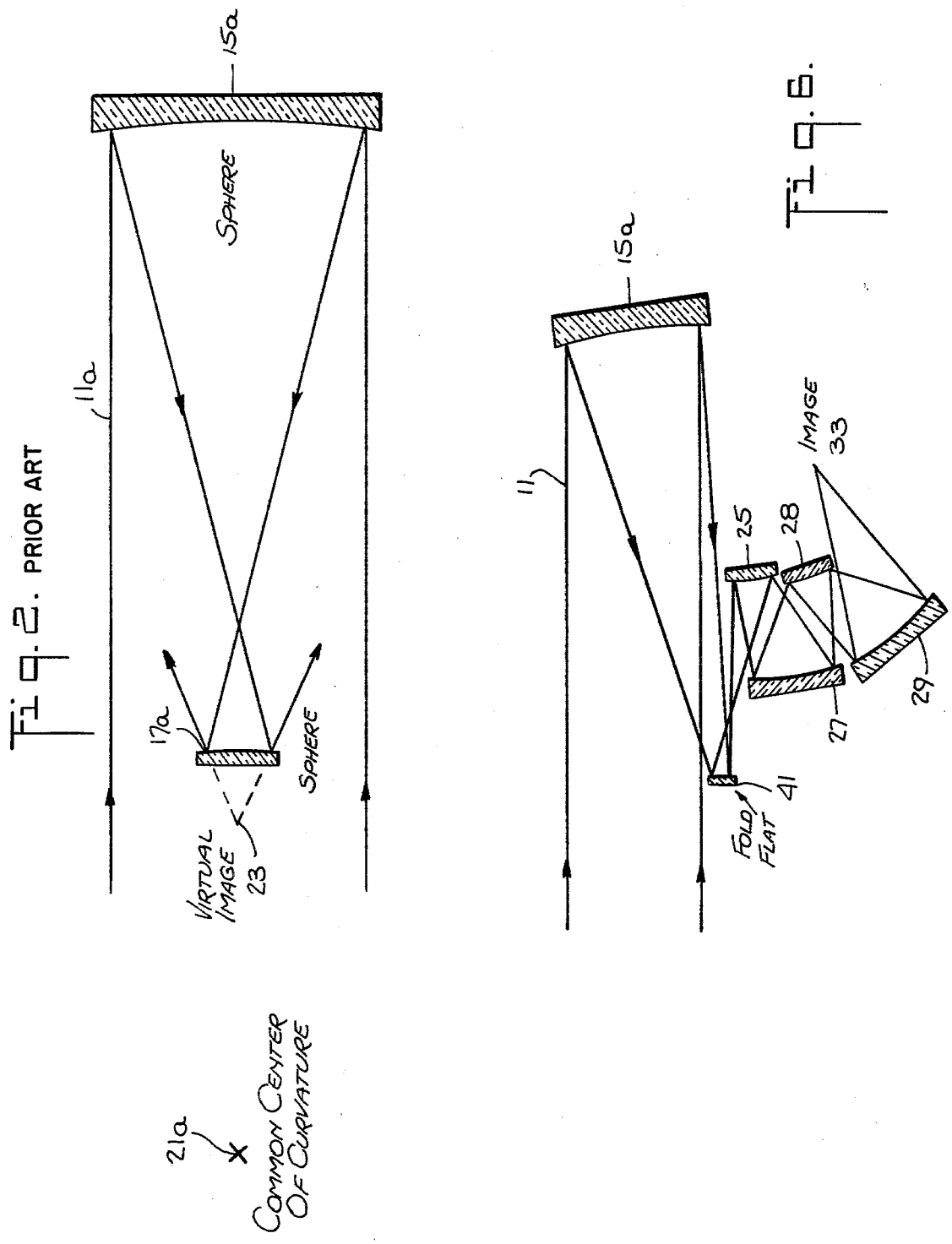

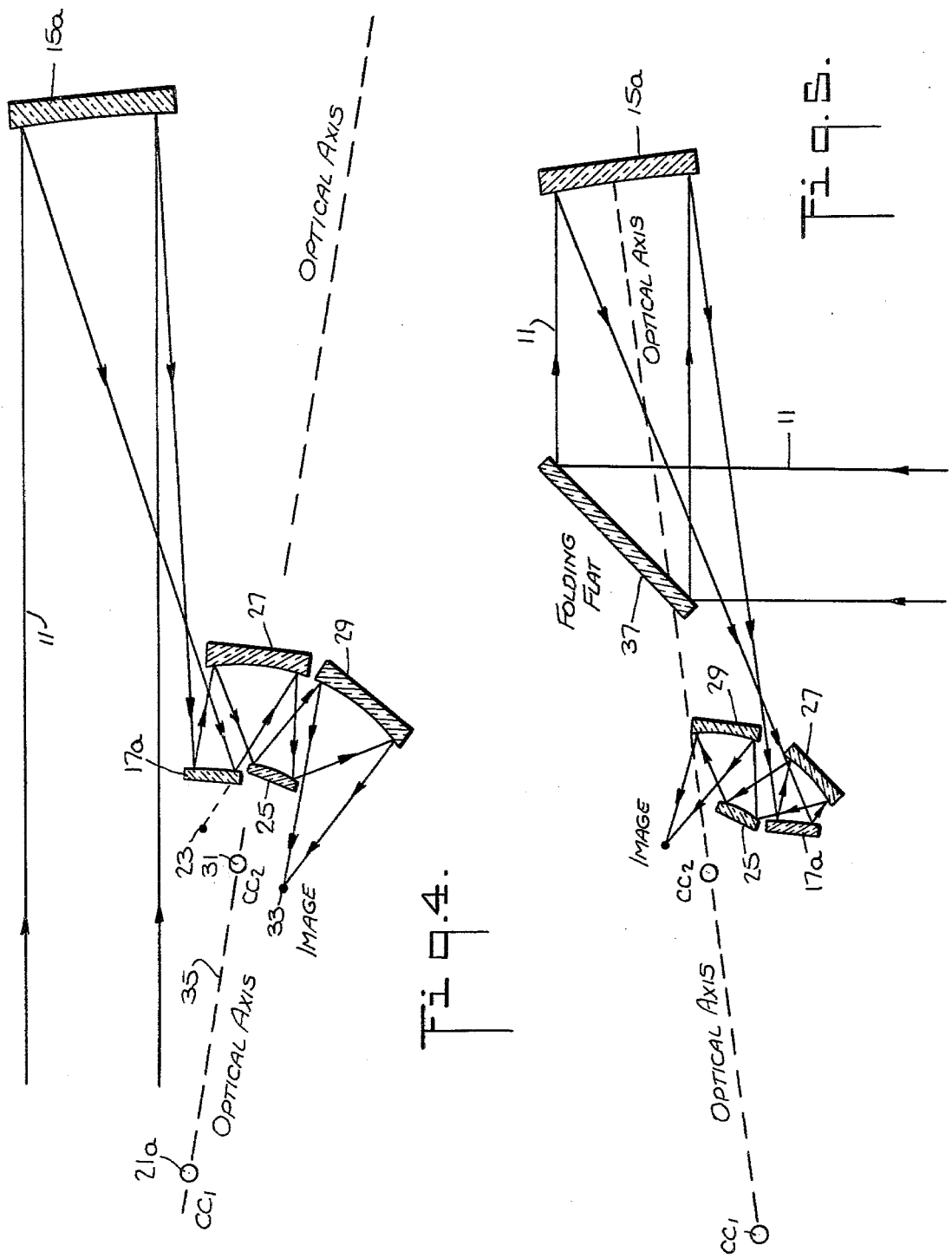

FOUR MIRROR UNOBSCURRED ANASTIGMATIC TELESCOPE WITH ALL SPHERICAL SURFACES

BACKGROUND OF THE INVENTION

This invention relates to optical systems in general and more particularly to an improved unobscured anastigmatic telescope which is constructed with all spherical surfaces.

Most telescope systems presently in use, constructed from mirrors, require at least one aspheric surface. When these telescopes are used in an unobstructed, off axis version, expense becomes extremely high because of the need to make a full aspheric surface in order to obtain a section thereof for use in the telescope. Furthermore, the use of aspheric surfaces creates alignment problems.

There has, however, been developed, 80 years or so ago, a system known as the Schwarzschild system. This comprises two spherical mirrors, one concave and one convex. The parallel light to be imaged enters through a central aperture in the concave mirror, it is reflected from the convex mirror to the concave mirror which then forms an image. The system is well corrected for spherical aberration, coma and astigmatism. However, the primary drawback of the system and the reason why it has not gained wide acceptance is that the concave spherical mirror must be much larger than the entrance aperture.

There is a need for improved telescopes, particular telescopes which are capable of providing a strip or a ring field. Such telescopes, for example, are used in spacecraft for scanning purposes, the scanned information then being transmitted to the Earth and reconstructed into an image over a wide field of view. Such systems may also find use in generating ring field images for various purposes.

A ring field system which is useful for forming in accurate micro detail an image of an object with high resolution utilizing only spherical mirrors is disclosed in U.S. Pat. No. 3,748,015. This is also a system which is free from spherical aberration, coma and distortion. This, however, is a system which requires an object to be imaged, i.e., it is not in the nature of a telescope.

SUMMARY OF THE INVENTION

The present invention provides an improved, four mirror, unobscured, anastigmatic telescope with all spherical surfaces, by using a backwards Schwarzschild system in combination with a system of the general type taught in the aforementioned U.S. Pat. No. 3,748,015.

More specifically it comprises a telescope made only of spherical mirrors including a first mirror system comprising a first, concave spherical mirror and a second, convex spherical mirror having a common center of curvature, the ratio of the radius of said first concave mirror to said second convex mirror being approximately $\sqrt{5}+1:\sqrt{5}-1$, said first mirror arranged to intersect input rays of collimated light and to direct them to said second mirror, said first and second mirrors arranged off axis so as to not obstruct the light path to said first mirror; and a second mirror system comprising at least a third concave mirror and a fourth convex mirror having a common center of curvature, the radius of said third mirror being approximately twice the radius of said fourth mirror, said third mirror positioned to intersect light reflected from said second mirror and to reflect it to said fourth mirror, said fourth mirror reflecting light back to said third mirror from which it is reflected to form a real image, the optical axis of said system being defined by a line between the centers of curvature of said first and second systems.

It has been discovered that the Schwarzschild system is also corrected for spherical aberration, coma and astigmatism when used backwards, i.e., with the collimated incident light hitting the concave mirror first. This forms a virtual image which is well corrected but is unuseable since it is virtual. Unlike the conventional Schwarzschild system, neither mirror is larger than the entrance aperture. Although this virtual image could be reimaged into a real image using confocal parabolas corrected for spherical aberration, coma and astigmatism, it is desired to avoid such because of the aforementioned problems with off axis aspherical surfaces. An all spherical relay was investigated by Schwarzschild around 80 years ago. In the complete system, the light from the Schwarzschild convex mirror is reflected onto another concave spherical mirror and from there to a convex spherical mirror which forms the final image. However, relays of this nature only have favorable geometric configurations when their magnification is five times or larger. This gives a very slow f number, long focal length design, which could be desirable in some situations. (A lot of Petzval curvature is introduced by the relay because of its deep radii and small size.)

However, in order to obtain a fast speed relay, a one to one relay is desired. This is accomplished by the aforementioned parabolas. However, as noted above, it is desired to have all spherical surfaces. In accordance with the present invention, the backwards Schwarzschild system is thus combined with a system of the general type shown in the aforementioned patent. This system now takes the virtual image of the backwards Schwarzschild system and converts it into a real image with one to one magnification in a relay that is corrected for a spherical aberration, coma, astigmatism and Petzval curvature. It has a useable two dimensional field which is rather small because the conjugate points are considerably displaced from the center of curvature, the system having no optical axis, being concentric about the center of curvature of the mirrors, in order to avoid obscuration. However, it can be used to provide a very wide angle ring field or a moderately wide angle strip field, i.e., a chord of the ring field.

To reduce system size, it is possible to fold the system, two folding embodiments being shown in detail.

BRIEF DESCRIPTION OF THE DRAWINGS

FIG. 2 is a similar view showing a backwards Schwarzschild telescope.

FIG. 4 is an optical schematic of a first embodiment of the telescope of the present invention.

FIG. 5 is a diagram illustrating a flipped over version of the system of FIG. 4 which gives improved performance for a ring field.

FIG. 6 is a similar view of a compact folding arrangement of the system of FIG. 4.

DETAILED DESCRIPTION OF THE INVENTION

Figure 1:
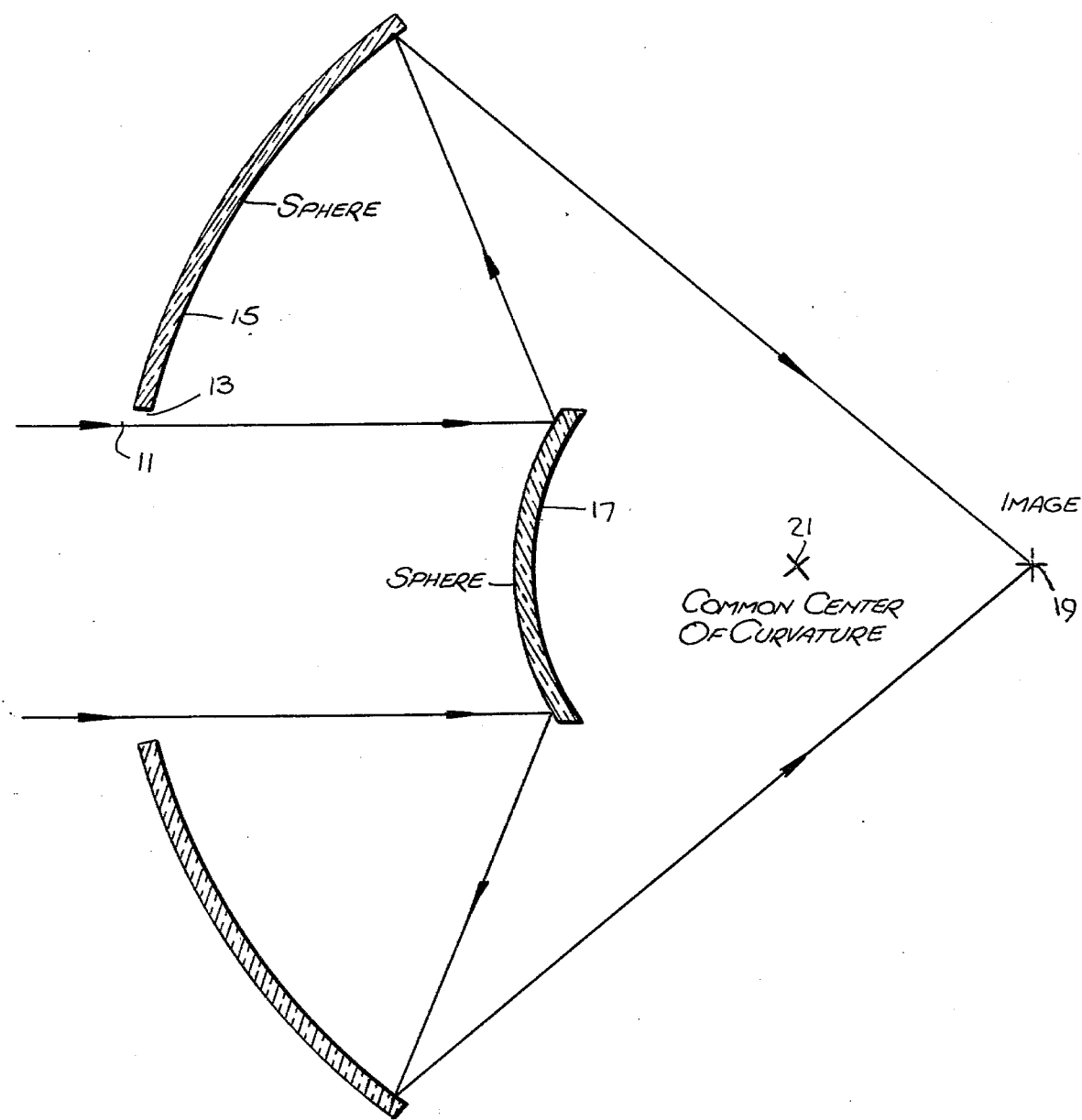
FIG. 1 is an optical schematic of a conventional Schwarzschild anastigmatic telescope using concentric spheres.

In order to obtain a better understanding of the present invention, the telescope system first developed by Schwarzschild, 80 or so years ago, will be explained with reference to FIG. 1. As illustrated, parallel rays 11 of incident light enter through an aperture 13 in a first spherical mirror 15 and strike the convex surface of a second spherical mirror 17. Light from the second spherical mirror 17 is reflected to the first spherical mirror 15 from which it is again reflected to form an image at point 19. The nature of the system is that the two mirrors 15 and 17 have a common center of curvature at point 21 and have a ratio of radii approximately equal to $(\sqrt{5}+1)/(\sqrt{5}-1)$. As noted previously, although this system is well corrected for spherical aberration, coma and astigmatism at the third order level, it has not been widely used because the size of the mirror 15 must be much larger than the entrance aperture 13.

FIG. 2 illustrates the telescope of FIG. 1 used backwards. In this arrangement, the parallel incident light rays 11a strike the concave surface of a spherical mirror 15a from which they are reflected to a convex spherical mirror 17a. This system does not form a real image, but forms a virtual image at point 23. Again, as noted above, because the system does only form a virtual image, it has been completely neglected in the art, even though it is as well corrected as the conventional Schwarzschild design. Again, the two spheres have a common center of curvature at point 21a.

Figure 3A:
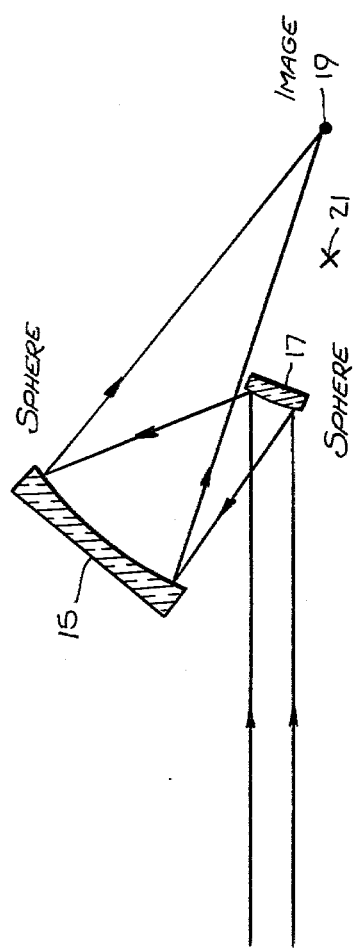
FIGS. 3a and 3b are unobstructed versions of the systems of FIGS. 1 and 2 respectively.
Figure 3B:
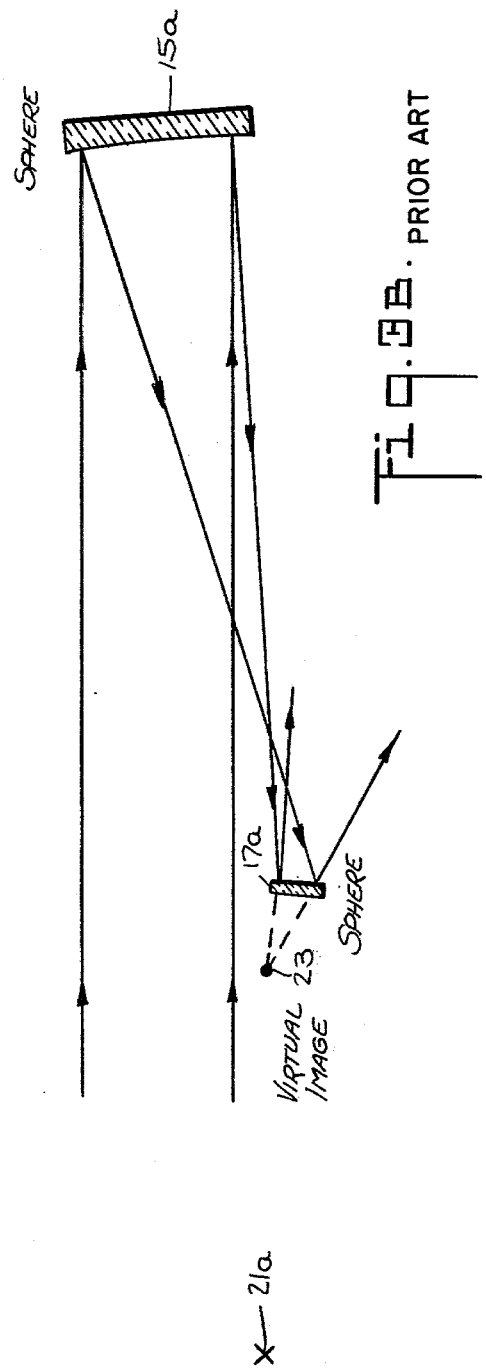

The versions of the systems shown on FIGS. 1 and 2 are obstructed. FIGS. 3a and 3b illustrate unobstructed versions of these two systems. As is evident from a comparison of these figures with FIGS. 1 and 2, the unobstructed version is obtained by using only sections of the systems shown on FIGS. 1 and 2. However, unlike systems employing aspheric surfaces, these off axis sections are themselves spheres and are much easier to manufacture. For example, were the mirror 15 aspheric and one required a section above the entrance aperture 13, it would be necessary, for example, to construct a complete parabolic mirror and then cut out of the parabolic mirror the required section. This is expensive, requiring the manufacture of a relatively large mirror where only a portion thereof is needed. Furthermore, alignment of parabolic mirrors is more difficult than alignment of spherical mirrors.

With respect to the systems of FIG. 3, it should be noted that these systems have no optical axis as such since both of the mirrors 15 and 17 or 15a and 17a are concentric about a common point, i.e., their center of curvature.

As indicated above, a system of the general type disclosed in U.S. Pat. No. 3,748,015 is used to relay the virtual image 23 formed by the backwards Schwarzschild system. Thus, as shown on FIG. 4, the collimated input 11 is incident upon the mirror 15a from which it is reflected to the mirror 17a. The mirror 17a does not form a real image but forms a virtual image 23 therebehind. In order to convert this image, the system of the aforementioned patent is used. This system comprises three reflecting surfaces. These include the mirror 25 which is convex and mirrors 27 and 29 which are concave. The two mirrors 27 and 29 are actually part of the same surface of curvature and can be so constructed if desired. The center of curvature of all of the mirrors 25, 27 and 29 is located at point 31. The mirror 27 intersects the light reflected from mirror 17a, reflects it onto the mirror 25 from which it is reflected onto the mirror 29 which then forms an image at point 33. The optical axis of the system is defined by the line 35 drawn between the centers of curvature 21a and 31. Examination of the figure will show that in the plane of the paper, the field of view is restricted if unobscured operation is to be obtained. However, the field in and out of the paper can be made quite large. Furthermore, the system can be converted into a ring field system by a rotation of the system about the optical axis. This would result in a relatively large mirror 15a of annular shape. Such could be avoided if the mirror 15a were on the optical axis.

A configuration of this nature is illustrated on FIG. 5. This configuration is obtained by flipping over the arrangement made up of mirrors 25, 27 and 29. In doing so, however, the mirrors now obstruct the line of sight to the mirror 15a. To overcome this problem, a folding flat mirror 37 is utilized so that the input is from below and is then reflected onto the mirror 15a.

FIG. 6 shows a folded, more compact arrangement of the system of FIG. 4. A folding flat mirror 41 is arranged to intersect the light reflected from the mirror 15a to direct it onto the mirror 25. From the mirror 25, light is reflected to the mirror 27, then to mirror 28 and to mirror 29 which finally forms the image 33 in the manner described above.

The mirrors 15a and 25 have a ratio of their radii of $\sqrt{5}+1/\sqrt{5}-1$. This insures a virtual image with no spherical aberration, coma or astigmatism at the third order level. The radius of mirror 28 is approximately ½ the radius of mirrors 27 and 29 to also give best correction. System performance is optimized by departing slightly from these figures.

The following table gives an example of the embodiment illustrated in FIG. 4.

| Surface | Radius | Air Space |
|---------|--------|-----------|
| 15a | −8.000 | −5.195 |
| 17a | −5.209 | +0.700 |
| 27 | −1.578 | −0.767 |
| 25 | −0.900 | +0.767 |
| 29 | −1.578 | −1.483 |
| 33 | Flat | |

The entrance pupil is 13 units in front of surface 15a and the input beam has a field angle of 7 degrees.

I claim:

1. An all spherical telescope optical system comprising:
   (a) a first mirror system comprising a first, concave spherical mirror and a second, convex spherical mirror having a common center of curvature the ratio of the radius of said first, concave mirror to said second, convex mirror being approximately $\sqrt{5}+1:\sqrt{5}-1$, said first mirror arranged to intersect input rays of collimated light and to direct them to said second mirror, said first and second mirrors arranged off axis so as to not obstruct the light path to said first mirror; and
   (b) a second mirror system comprising at least a third, concave spherical mirror and a fourth, convex spherical mirror having a common center of curvature, the radius of said third mirror being approximately twice the radius of said fourth mirror, said third mirror positioned to intersect light reflected from said second mirror and to reflect it to said fourth mirror, said fourth mirror reflecting light back to said third mirror from which it is reflected to form a real image, the optical axis of said system being defined by a line between the centers of curvature of said first and second systems.

2. The apparatus according to claim 1 wherein said optical axis passes through the center of said first mirror and further including a folding flat mirror for directing incident light coming from a direction oblique to said optical axis onto said first mirror, said third mirror containing a gap through which the reflected light from said first mirror passes to strike said second mirror, said third mirror thereby being formed of first and second sub-mirrors, and all of said mirrors being rotationally symmetric about said optical axis so as to provide a ring field.

3. Apparatus according to claim 1 and further including a folding flat mirror between said first mirror and said second mirror.

4. A telescope constructed from only spherical mirror comprising:
   (a) a first, concave spherical mirror rotated off axis with respect to collimated rays of light which are to be imaged, said mirror adapted to intersect said collimated rays;
   (b) a second, convex spherical mirror having the same center of curvature as said first mirror disposed to intersect the light reflected by said first mirror, the ratio of radii of said first and second mirrors being approximately $\sqrt{5}+1:\sqrt{5}-1$;
   (c) a third, concave spherical mirror positioned to intersect light reflected from said second mirror;
   (d) a fourth, convex spherical mirror having a common center of curvature with said third mirror, the radius of said fourth mirror being approximately one half the radius of said third mirror, arranged to intersect light reflected from said third mirror; and
   (e) a fifth, concave spherical mirror of radius equal to that of said third mirror and having a common center of curvature therewith arranged to intersect light reflected by said fourth mirror and to form a real image, a line between the centers of curvature of said first and second and third, fourth and fifth mirrors forming the optical axis of the system.

5. A telescope according to claim 4 wherein said third and fifth mirrors are formed as a single mirror.

6. The telescope according to claim 4 wherein said optical axis passes through the center of said first mirror and further including a folding flat mirror for directing incident collimated light coming from a direction oblique to said optical axis onto said first mirror, said third and fifth mirrors spaced apart so that light reflected from said first mirror passes through a gap therebetween to strike said second mirror.

7. A telescope according to claim 6 wherein all of said mirrors are rotational symmetric about said optical axis so as to provide a ring field.

8. A telescope according to claim 4 and further including a folding flat mirror between said first mirror and said second mirror.

* * * * *